United States Patent
Paxton et al.

[11] Patent Number: 5,803,493
[45] Date of Patent: Sep. 8, 1998

[54] HYBRID BLOWDOWN INFLATOR WITH REDUCED PRESSURE BUILDUP

[75] Inventors: Donald J. Paxton, Romeo, Mich.; Mark L. Garcia, Logan; David J. Green, Brigham City, both of Utah

[73] Assignee: Morton International Inc., Chicago, Ill.

[21] Appl. No.: 842,810

[22] Filed: Apr. 17, 1997

[51] Int. Cl.⁶ .................................................. B60R 21/26
[52] U.S. Cl. ........................................... 280/737; 280/741
[58] Field of Search .................................. 280/736, 737, 280/741, 742; 222/5

[56] References Cited

U.S. PATENT DOCUMENTS

| | | |
|---|---|---|
| 3,743,318 | 7/1973 | Yamaguchi et al. ..................... 280/737 |
| 3,836,170 | 9/1974 | Grosch et al. ........................... 280/737 |
| 5,226,561 | 7/1993 | Hamilton et al. ....................... 280/737 |
| 5,230,531 | 7/1993 | Hamilton et al. ....................... 280/737 |
| 5,344,186 | 9/1994 | Bergerson et al. ..................... 280/737 |
| 5,531,473 | 7/1996 | Rink et al. .............................. 280/737 |
| 5,542,702 | 8/1996 | Green et al. ............................ 280/737 |
| 5,653,463 | 8/1997 | Jeong ...................................... 280/737 |

OTHER PUBLICATIONS

R. L. Frantom, "Hybrid Airbag Inflator Technology" presented May 19, 1993 at the Airbag In Modern Transportation, May 19–20, 1993, Troy, Michigan.

*Primary Examiner*—Paul N. Dickson
*Attorney, Agent, or Firm*—George W. Rauchfuss, Jr.

[57] ABSTRACT

A hybrid inflator for a vehicle airbag module produces an initial release of essentially unheated, stored, pressurized gas from the gas storage chamber of the inflator by way of a projectile, releasable from a nozzle opening in a combustion chamber housing upon combustion of a gas-generating combustible material housed within the combustion chamber housing, which ruptures and passes through a frangible burst element retaining the stored, pressurized gas in the gas storage chamber of the inflator, thereby permitting, initially, the unheated, stored, pressurized gas to discharge through the ruptured burst element and flow externally past the combustion chamber housing in an isolation housing and then to exit the inflator through gas exhaust ports in the inflator.

16 Claims, 1 Drawing Sheet

HYBRID BLOWDOWN INFLATOR WITH REDUCED PRESSURE BUILDUP

FIELD OF THE INVENTION

This invention relates to a hybrid inflator for a vehicle airbag module in which the inflator has reduced pressure buildup. More particularly, the invention relates to a hybrid blowdown inflator in which stored, pressurized gas is released from the inflator to begin inflation of an airbag before any significant heating of the stored, pressurized gas occurs to cause a buildup in gas pressure.

BACKGROUND TO THE INVENTION

For inflating an inflatable airbag cushion in an airbag module for a motor vehicle the inflator employed in the past has generally been a pyrotechnic type inflator in which the necessary inflation gasses were produced by combustion of a pyrotechnic gas-producing material housed in a combustion chamber of the inflator. However, numerous drawbacks were apparent with said pyrotechnic inflators including, among others, the necessity for a relatively large quantity of combustible pyrotechnic gas-producing material and the production of hot particulate matter during the combustion process, which hot particulate matter had to be filtered out of inflation gasses entering the airbag.

In an effort to avoid some of these drawbacks there has been a movement towards the use of hybrid inflators instead of said pyrotechnic inflators. In a hybrid inflator of the type known as a blowdown hybrid inflator a relatively large quantity of inflation gas is stored in a pressurized state in a pressure chamber of the inflator. The stored, pressurized gas is retained in the pressure chamber, until its deployment is desired, by means of a suitable frangible burst means sealing said pressure chamber from gas exit ports in the inflator. When release of the stored, pressurized gas is called for, generally a relatively small amount of combustible pyrotechnic material is ignited to cause heating of the pressurized gas, increasing its pressure beyond the rupture pressure of the frangible burst means, thereby causing the burst means to rupture and release the heated, pressurized gas. However, a significant drawback of such a hybrid blowdown inflator results from the heating of the stored, pressurized gas causing an undesirable pressure buildup before the frangible burst means ruptures. This results in the problem that the inflation gas initially released from the inflator into the airbag is hot, highly pressurized gas and can cause the reaction canister housing the airbag module to deform or "bell mouth" and also cause extreme tearing stresses on the airbag fabric itself. Also, after the initial release of high pressure gas there is a significant pressure drop in the subsequently released gas causing possible uneven inflation of the airbag.

It is therefore desirable that a hybrid inflator be provided which reduces or substantially eliminates the foregoing drawbacks caused by the undesirable gas pressure buildup. It is further desirable that such an improved hybrid inflator be provided which is reliable and of a low-cost design, functions simply and reliably to release the stored, pressurized gas, and in which the initial gas released is cold, stored, pressurized gas.

BRIEF SUMMARY OF THE INVENTION

A hybrid inflator for a vehicle airbag module is provided by this invention in which the hybrid inflator produces an initial release of essentially unheated, stored, pressurized gas from the gas storage chamber of the inflator by means of a projectile, releasable from a nozzle opening in a combustion chamber housing upon combustion of a gas-generating combustible material housed within the combustion chamber housing, which ruptures and passes through a frangible burst means retaining the stored, pressurized gas in the gas storage chamber of the inflator, thereby permitting, initially, the unheated, stored, pressurized gas to discharge through the ruptured burst means and flow externally past the combustion chamber housing in an isolation housing and then to exit the inflator through gas exhaust ports in the inflator. In one embodiment the projectile is a solid projectile having a pointed end portion facing the frangible burst means. The gas-producing combustible material can be a solid pyrotechnic material or a fluid fuel or the like.

In a preferred embodiment of this invention, the hybrid inflator for a vehicle airbag module comprises:

a) a pressure bottle having an outlet opening at one end, said outlet opening receiving and securing therein a first end of a tubular isolation housing, b) the isolation housing defining a sidewall projecting into the pressure bottle to a second end of the isolation housing, said second end of the isolation housing defining a mouth closed by a frangible burst disc thereby forming in the pressure bottle a closed gas storage chamber containing stored, pressurized gas, c) a base element secured in the first end of the isolation housing, d) a combustion chamber coaxially positioned within the isolation housing and secured to the base element, said combustion chamber having an ignition source at a first end thereof and defining a sidewall terminating in a nozzle with a nozzle opening at a second end thereof, said nozzle having releasably positioned therein a projectile axially aligned with the frangible burst disc in the isolation housing, the combustion chamber containing gas-generating combustible material adjacent the projectile, e) gas exhaust ports in the base element of the isolation housing, said exhaust ports located peripherally and exteriorly of the combustion chamber, and interiorly of the isolation housing, the projectile being explosively releasable from the nozzle opening for being propelled through the burst disc by pressure created in the combustion chamber upon ignition of the combustible material for causing the projectile to rupture the burst disc and pass into the gas storage chamber whereby, initially, unheated, stored, pressurized gas in the gas storage chamber is dischargeable into the mouth of the isolation housing for flowing between the sidewall of the combustion chamber and the sidewall of the isolation housing to and out the gas exhaust ports in the base element.

BRIEF DESCRIPTION OF THE DRAWINGS

The invention is illustrated but not limited, by the attached drawings of a preferred embodiment of the invention, in which.

DETAILED DESCRIPTION OF THE INVENTION

Figure 1:
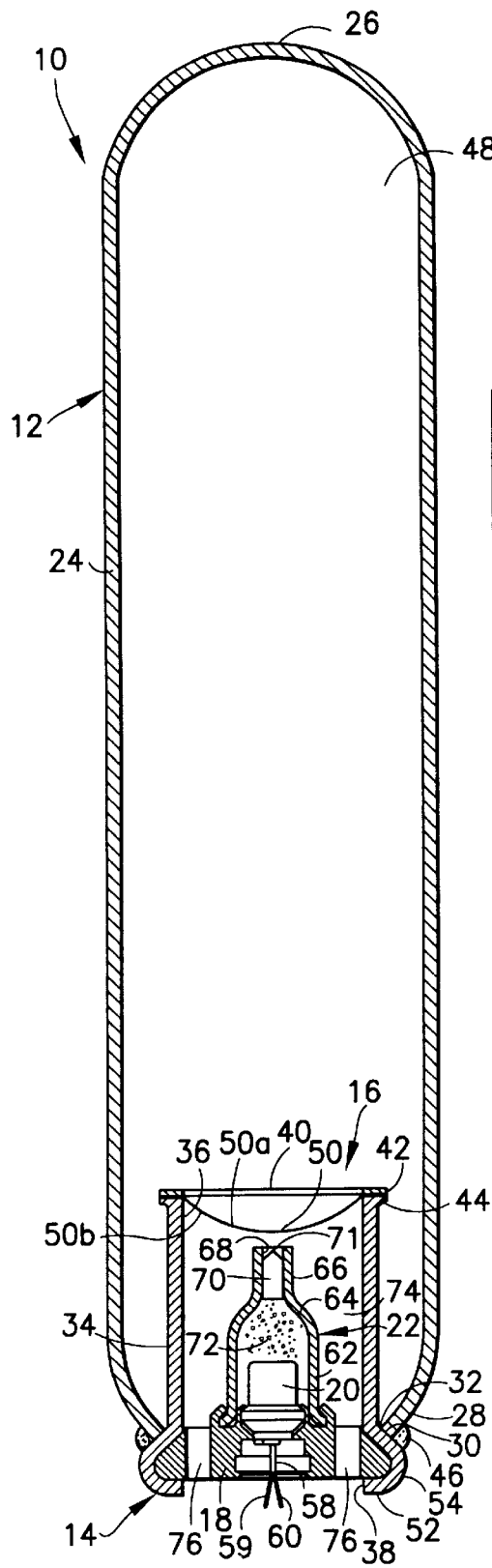
FIG. 1 is a partial cross-sectional view of a hybrid inflator of this invention prior to activation of the inflator.
Figure 2:
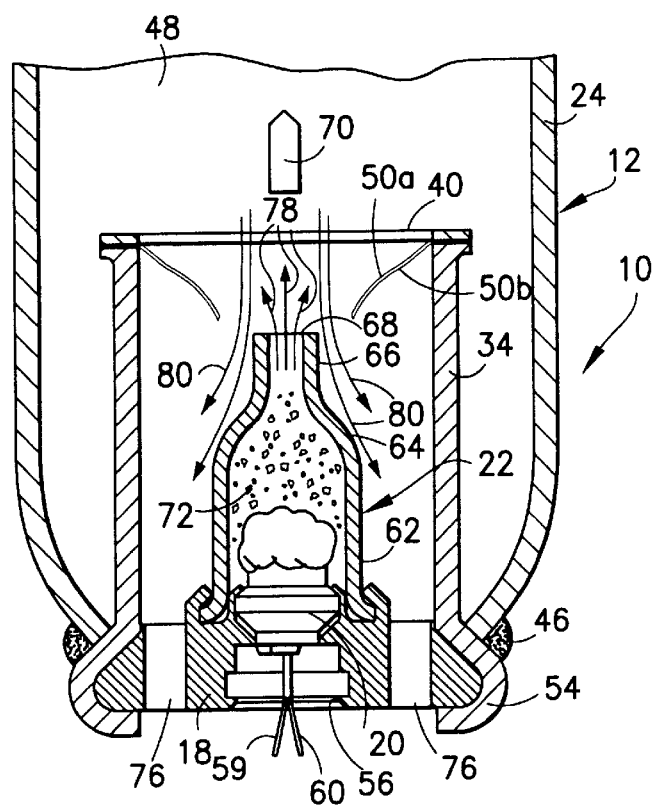
FIG. 2 is an enlarged, partial cross-sectional view of a portion of the inflator of FIG. 1 during activation of the inflator and during initial release of the stored, pressurized gas from the hybrid inflator.

An inflator 10 in accordance with this invention is illustrated in FIGS. 1 and 2. The inflator comprises a pressure bottle 12, an isolation housing 14 with a frangible burst means 16 and base element 18 including an initiator 20 and combustion chamber 22.

The pressure bottle 12 is generally steel and has a cylindrical sidewall 24, a closed end wall 26 and opposite the closed end a neck 28 with an open end 30 defining an outlet opening 32. The closed end wall 26 is generally formed integrally with the cylindrical sidewall 24, e.g. by deep drawing manufacturing technique. Mounted through outlets opening 32 is the isolation housing 14 which extends axially within the bottle 12 and is defined by a cylindrical sidewall 34 coaxial with the sidewall 24 of bottle 12 and terminating within the bottle 12 in an open mouth 36 and exterior of the bottle in an open throat 38. The open mouth 36 is closed by a frangible burst means 16 mounted across the mouth. Usually, the burst means 16 is a circular metal burst disc 40 which is preferably made of Inconel and having its periphery 42 secured to a flanged end 44 of the housing sidewall 34. Isolation housing 14 is secured in the open end 30 of bottle 12, such as by a suitable weld 46. The bottle 12, isolation housing 14 and burst disc 40 define a gas storage chamber 48 for storage of pressurized, inert gas, such as argon or nitrogen, at a predetermined pressure, generally from between about 2500 to about 4000 psi.

The metal burst disc 40 will have a dome portion 50 extending concavely outwardly from gas storage chamber 48 due to the pressure of the gas stored in the chamber. Dome 50 has a concave surface 50a and a convex surface 50b, with the convex surface facing combustion chamber 22.

The open throat 38 of isolation housing 14 is formed at the distal end 52 of a torus- or C-shaped radial rib 54 extending from sidewall 34. It is this rib 54 which is welded to neck 28 of the bottle 12. Rib 54 retains base element 18 therein. Base element 18 has a central opening 56 in which is mounted initiator 20, generally an electro-explosive initiator, also referred to as a squib or ignitor. The initiator 20 has a plug terminal 58 for receiving the lead wires 59, 60 from a sensor (not shown). The initiator 20 will contain a readily ignitable material or powder, such as for example, zirconium potassium perchlorate or the like.

Surrounding the initiator 20, mounted in base element 18 and extending axially into bottle 12, coaxially within isolation housing 14, is combustion chamber sidewall 62. Combustion chamber sidewall 62 tapers in a neck 64 to a nozzle 66 terminating in a nozzle opening 68 adjacent burst disc 40. Releasably positioned within nozzle 66 is a generally elongated bullet-shaped, solid projectile 70, axially aligned with the burst disc 40. The sidewall 62, projectile 70 and initiation element 20 together define combustion chamber 22 in which is placed a gas-generating combustible material 72, which may be for example, a pyrotechnic solid such as BKNO$_3$, or a fluid fuel and oxidant, or a compatible mixture of both.

Isolation housing 14 with its burst disc 40, base element 18 and combustion chamber 22 together define an isolation chamber 74 into which pressurized gas from gas storage chamber 48 is released.

Base element 18 is provided with gas exhaust ports 76 located peripherally of the combustion chamber sidewall 62 and interiorly of the isolation housing sidewall 34 for providing an exit for inflation gas from isolation chamber 74 to an airbag (not shown).

Projectile 70 is preferably a solid bullet-shaped projectile having a pointed end portion 71 facing convex surface 50b of burst disc 40. The projectile 70 can be placed at any suitable distance from the burst disc 40 but preferably pointed end 71 of the projectile is axially spaced from the convex surface of the burst disc by a distance of about 0.125 inch (3.2 mm). The size, shape and material of construction of the projectile 70, the size, shape and material of construction of the burst disc 40, as well as the spacing therebetween, and the friction of the fit between the projectile and the nozzle, the burn rate of the combustible material, are some of the factors determining the force required to be developed in the combustion chamber 22 to release the projectile from nozzle 66. For example, for an 0.25 inch (6.4 mm) diameter solid, bullet-shaped steel projectile with a 45° angle on its end and located 0.125 inch (3.2 mm) from an 0.16 inch (4.1 mm) thick Inconel burst disc a force of about 3000 psi is utilized to rupture the burst disc.

Operation of the inflator 10 of this invention is illustrated in FIG. 2. Upon sensing a condition calling for inflation of an airbag, a sensor (not shown) will send a signal through lead wires 59, 60 to initiator 20 which fires and ignites gas-generating combustible material 72 in combustion chamber 22 resulting in a buildup of gas pressure (indicated by arrows 78) in the combustion chamber causing projectile 70 to be forcibly propelled from nozzle 66 through nozzle opening 68. Projectile 70 is propelled to and through burst disc 40, rupturing the disc and causing the cold, pressurized gas stored in gas storage chamber 48 to immediately flow (indicated by arrows 80) out of the gas storage chamber through the ruptured burst disc 40 and into isolation chamber 74 before any significant heating of the stored gas or any significant increase in the pressure of the stored gas can occur. The exiting gas 80 in isolation chamber 74 flows past nozzle 66, between sidewalls 34, 62 of the isolation housing and combustion chamber and out gas exhaust ports 76 for inflating an airbag (not shown). This causes an initial drop in the pressure of the stored gas in chamber 48 and provides for a soft onset of inflation of an airbag. After this initial release of stored unheated gas, the lower pressure gas in storage chamber 48 is heated by both the combustion gases exiting nozzle opening 68 and by the heated sidewall 62 of combustion chamber 22 as the exiting gas flows past this sidewall on its way to gas exhaust ports 76.

The projectile 70 will be propelled into gas storage chamber 48 and is of such a size, larger than the size of exhaust ports 76 so that it cannot find its way out the exhaust ports into the airbag.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A pressurized gas inflator for a vehicle airbag module, said inflator comprising:

a) a pressure bottle having an outlet opening at one end, said outlet opening receiving and securing therein a first end of a tubular isolation housing, b) the tubular isolation housing defining a sidewall projecting into the pressure bottle to a second end of the isolation housing, said second end of the isolation housing defining a mouth closed by a frangible burst means thereby forming in the pressure bottle a closed gas storage chamber containing stored, pressurized gas, c) a combustion chamber coaxially positioned within the isolation housing and secured, at a first end thereof, in the outlet opening of the pressure bottle, said combustion chamber having an ignition source at said first end thereof and defining a sidewall having a neck terminating in a nozzle with a nozzle opening at a second end thereof, said nozzle having releasably positioned therein a projectile axially aligned with the frangible burst means in the isolation housing, the combustion chamber containing gas-generating combustible material adjacent the projectile, d) gas exhaust ports located peripherally and exteriorly of the first end of the combustion chamber, and interiorly of the first end of the isolation housing adjacent the outlet opening of the pressure bottle, the projectile being explosively releasable from the nozzle opening for being propelled through the burst means by pressure created in the combustion chamber upon ignition of the combustible material for causing the projectile to rupture the burst means and pass into the gas storage chamber whereby, initially, unheated, stored, pressurized gas in the gas storage chamber is dischargeable into the mouth of the isolation housing for flowing between the sidewall of the combustion chamber and the sidewall of the isolation housing to and out the gas exhaust ports.

2. The pressurized gas inflator of claim 1 wherein the projectile is solid and has a pointed end portion facing the frangible burst means.

3. The pressurized gas inflator of claim 1 wherein the combustible material is a solid pyrotechnic material.

4. The pressurized gas inflator of claim 1 wherein the combustible material is a fluid fuel.

5. The pressurized gas inflator of claim 1 wherein the frangible burst means comprises a metal burst disc.

6. The pressurized gas inflator of claim 5 wherein the metal burst disc has a convex surface and a concave surface, with the convex surface facing towards the releasable projectile.

7. The pressurized gas inflator of claim 5 wherein the releasable projectile is axially spaced from the convex surface of the burst disc a distance of about 0.125 inch (3.2 mm).

8. The pressurized gas inflator of claim 7 wherein the metal burst disc has a thickness of about 0.016 inch (0.4 mm), the projectile is a bullet-shaped metal projectile having a diameter of 0.25 inch (6.4 mm) and an angled pointed end portion having an angle of about 45°.

9. A pressurized gas inflator for a vehicle airbag module, said inflator comprising:

a) a pressure bottle having an outlet opening at one end, said outlet opening receiving and securing therein a first end of a tubular isolation housing, b) the isolation housing defining a sidewall projecting into the pressure bottle to a second end of the isolation housing, said second end of the isolation housing defining a mouth closed by a frangible burst means thereby forming in the pressure bottle a closed gas storage chamber containing stored, pressurized gas, c) a base element secured in the first end of the isolation housing, d) a combustion chamber coaxially positioned within the isolation housing and secured to the base element, said combustion chamber having an ignition source at a first end thereof and defining a sidewall terminating in a nozzle with a nozzle opening at a second end thereof, said nozzle having releasably positioned therein a projectile axially aligned with the frangible burst means in the isolation housing, the combustion chamber containing gas-generating combustible material adjacent the projectile, e) gas exhaust ports in the base element of the isolation housing, said gas exhaust ports located peripherally and exteriorly of the combustion chamber, and interiorly of the isolation housing, the projectile being explosively releasable from the nozzle opening for being propelled through the burst means by pressure created in the combustion chamber upon ignition of the combustible material for causing the projectile to rupture the burst means and pass into the gas storage chamber whereby, initially, unheated, stored, pressurized gas in the gas storage chamber is dischargeable into the mouth of the isolation housing for flowing between the sidewall of the combustion chamber and the sidewall of the isolation housing to and out the gas exhaust ports in the base element.

10. The pressurized gas inflator of claim 9 wherein the projectile is solid and has a pointed end portion facing the frangible burst means and said frangible burst means is a burst disc.

11. The pressurized gas inflator of claim 9 wherein the combustible material is a solid pyrotechnic material.

12. The pressurized gas inflator of claim 9 wherein the combustible material is a fluid fuel.

13. The pressurized gas inflator of claim 9 wherein the frangible burst means is a metal burst disc.

14. The pressurized gas inflator of claim 13 wherein the metal burst disc has a convex surface and a concave surface, with the convex surface facing towards the releasable projectile.

15. The pressurized gas inflator of claim 13 wherein the releasable projectile is axially spaced from the convex surface of the burst disc a distance of about 0.125 inch (3.2 mm).

16. The pressurized gas inflator of claim 15 wherein the metal burst disc has a thickness of about 0.016 inch (0.4 mm), the projectile is a bullet-shaped metal projectile having a diameter of 0.25 inch (6.4 mm) and an angled pointed end portion having an angle of about 45°.

* * * * *